US012752541B2

(12) United States Patent
Schweitzer et al.

(10) Patent No.: US 12,752,541 B2
(45) Date of Patent: Oct. 6, 2026

(54) FLUID EJECTION DEVICE ASSEMBLIES

(71) Applicant: Hewlett-Packard Development Company, L.P., Spring, TX (US)

(72) Inventors: Paul David Schweitzer, Corvallis, OR (US); Kyle Drew Arnold Bahnsen, Vancouver, WA (US); Jeffrey Frank Bell, Corvallis, OR (US); Michael W. Cumbie, Corvallis, OR (US); Judson M. Leiser, Corvallis, OR (US); Melanie Lim, Corvallis, OR (US); Gary G. Lutnesky, Corvallis, OR (US); Max R Quinn, Corvallis, OR (US); Laura Wusstig, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 18/728,447

(22) PCT Filed: Feb. 4, 2022

(86) PCT No.: PCT/US2022/015237

§ 371 (c)(1),
(2) Date: Jul. 11, 2024

(87) PCT Pub. No.: WO2023/149895

PCT Pub. Date: Aug. 10, 2023

(65) Prior Publication Data

US 2025/0083445 A1 Mar. 13, 2025

(51) Int. Cl.
*B41J 2/175* (2006.01)

(52) U.S. Cl.
CPC ....... *B41J 2/17513* (2013.01); *B41J 2/17553* (2013.01); *B41J 2/17556* (2013.01)

(58) Field of Classification Search
CPC . B41J 2/17513; B41J 2/17553; B41J 2/17556
See application file for complete search history.

(56) References Cited

U.S. PATENT DOCUMENTS

| | | | | |
|---|---|---|---|---|
| 5,661,510 | A | 8/1997 | Brandon et al. | |
| 9,815,290 | B2 | 11/2017 | O'Reilly et al. | |
| 9,987,852 | B2 | 6/2018 | O'Reilly et al. | |
| 11,577,456 | B2 | 2/2023 | Chen et al. | |
| 2003/0082561 | A1 | 5/2003 | Sera | |
| 2003/0082851 | A1 | 5/2003 | Van Hoff | |
| 2004/0056918 | A1* | 3/2004 | Wang | B41J 2/19 347/22 |

(Continued)

FOREIGN PATENT DOCUMENTS

| | | | |
|---|---|---|---|
| CN | 1946556 | A | 4/2007 |
| CN | 105793044 | A | 7/2016 |

(Continued)

*Primary Examiner* — Jason S Uhlenhake
(74) *Attorney, Agent, or Firm* — Foley & Lardner LLP

(57) ABSTRACT

In one example in accordance with the present disclosure, a fluid ejection device assembly is described. The fluid ejection device assembly includes a monolithically molded fluidic structure to extend between a separately molded body comprising a print fluid reservoir and a fluid ejection device. The fluidic structure includes a plenum to receive a print fluid from the body at a fluidic interface.

20 Claims, 11 Drawing Sheets

(56) References Cited

U.S. PATENT DOCUMENTS

| | | | | |
|---|---|---|---|---|
| 2006/0001554 | A1 | 1/2006 | Morishita | |
| 2007/0206079 | A1 | 9/2007 | Brown et al. | |
| 2011/0316942 | A1 | 12/2011 | Koyama | |
| 2016/0001554 | A1* | 1/2016 | Chen | B41J 2/14024 347/50 |
| 2016/0236468 | A1* | 8/2016 | Chng | B41J 2/17546 |
| 2017/0092602 | A1 | 3/2017 | Meyers et al. | |
| 2018/0319160 | A1 | 11/2018 | Cumbie et al. | |
| 2020/0164647 | A1 | 5/2020 | Choy et al. | |
| 2020/0316592 | A1 | 10/2020 | Lutnesky et al. | |
| 2020/0343153 | A1 | 10/2020 | Cumbie et al. | |
| 2021/0154997 | A1 | 5/2021 | Eibl | |
| 2021/0221029 | A1 | 7/2021 | Chen et al. | |
| 2021/0252858 | A1 | 8/2021 | Cumbie et al. | |
| 2021/0260872 | A1 | 8/2021 | Fuller et al. | |
| 2021/0319955 | A1 | 10/2021 | Mahajan et al. | |

FOREIGN PATENT DOCUMENTS

| | | | |
|---|---|---|---|
| CN | 107924910 | A | 4/2018 |
| CN | 108367568 | A | 8/2018 |
| CN | 110461575 | A | 11/2019 |
| CN | 112154539 | A | 12/2020 |
| CN | 113412200 | A | 9/2021 |
| EP | 0713778 | A2 | 5/1996 |
| EP | 1403059 | A2 | 3/2004 |
| JP | 2018-086834 | A | 6/2018 |
| WO | 2019/203780 | A1 | 10/2019 |

* cited by examiner

FLUID EJECTION DEVICE ASSEMBLIES

CROSS-REFERENCE TO RELATED APPLICATIONS

This application is a U.S. National Stage Patent Application under 35 U.S.C. § 371 of PCT/US2022/015237, filed Feb. 4, 2022, which is hereby incorporated by reference in its entirety.

BACKGROUND

Printing devices may include a fluid ejection device assembly to contain and eject a print fluid (e.g., ink) onto a substrate. In some examples, the fluid ejection device assembly may be inserted into a printing device. Some examples of printing devices include an inkjet printer. In some examples, the fluid ejection device assembly may include a cartridge or pen device. In some examples, the fluid ejection device assembly may include a single print fluid (e.g., a single color of ink) in a single print fluid reservoir. In some examples, the fluid ejection device assembly may include multiple print fluids (e.g., multiple colors of ink) contained in separate print fluid reservoirs.

Typical printhead cartridges comprise a reservoir with capillary medium to hold ink, and a standpipe and plenum downstream of the medium, to deliver the ink to a printhead die. A flexible circuit comprises contact pads at the front side of the reservoir to connect to counter pads of the printer to receive print signals. The contact pads connect to flexible traces on the flexible circuit. The flexible circuit bends around the front/bottom edge along the bottom to bond its flexible traces to fluid ejection die bond pads at the die's head surface. Encapsulation may be applied to protect the bonds at the head surface.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
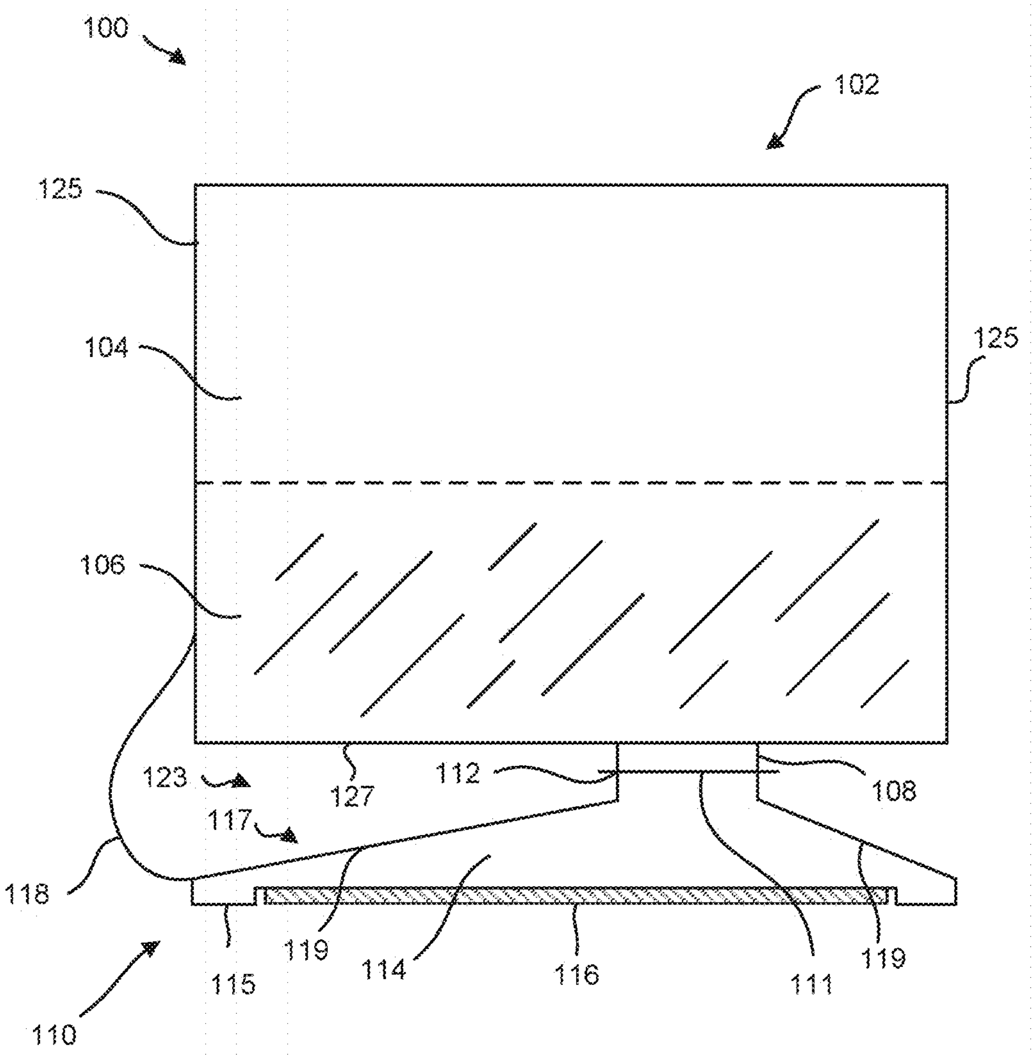
FIG. 1 illustrates a fluid ejection device assembly in a diagrammatic cross-sectional side view, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In this specification, a fluid ejection device assembly may refer to a combination of components that are assembled to form a product comprising a fluid ejection device. The fluid ejection device may consist of a fluid ejection die or may comprise a fluid ejection die, for example embedded in and/or adhered to a molded compound, like a molded board, so that the fluid ejection device comprises both the molded support and fluid ejection die. The fluid ejection device is configured to eject fluid out of at least one nozzle, for example out of a relatively high-density nozzle array having a resolution of at least 600 dots per inch. The fluid ejection device assembly be a fluid ejection cartridge, sometimes referred to as an integrated printhead cartridge. In some approaches, a fluid ejection device assembly includes a body forming a reservoir that on the shelf and before a first use contains print fluid for printing when installed in a host printer. The reservoir includes capillary medium to hold the print fluid at an appropriate backpressure. The body comprises a head surface to which the fluid ejection device is attached. Either the molded support component is attached to the head surface, or the fluid ejection die is directly attached to the head surface. The head surface may also be referred to as head surface or headland or headland surface. The fluid ejection device is to be attached to that headland. In a use orientation, the headland is formed on a lower bottom wall of the body. For example, the reservoir body may be molded from a polymer (e.g., thermoplastic resin), whereby the headland is formed during the molding of the body. In some instances, the headland includes a recess to receive the fluid ejection device.

The fluid ejection cartridges comprise a reservoir with capillary medium to hold ink. A flexible circuit comprises contact pads at the front side of the body to connect to counter pads of the printer to receive print and/or data signals to control the fluid ejection device. The contact pads connect to flexible traces on the flexible circuit. The flexible circuit bends around the front/bottom edge of the body, over the headland, to bond the flexible traces to fluid ejection die bond pads.

As such, the circuitry that is used to control the fluid ejection die may be exposed to ink during printing, or even after printing, and/or wear from servicing of the fluid ejection die. Servicing may include wiping or capping or other forms of servicing. The circuitry may corrode due to the print fluid. The circuitry may be mechanically or chemically compromised because of the servicing.

Furthermore, forming the headland to receive the fluid ejection device sometimes is accompanied by relatively complex molding requirements and relatively high manufacturing costs, for example, depending on the design, size and complexity of the reservoir body. Sometimes, there is a desire to increase the efficiency of fluid and air (e.g., bubble) routing through the fluid ejection device assembly.

The present specification describes examples of a fluid ejection device assembly with a fluidic structure that is formed separate from the reservoir body. The fluidic structure comprises the headland that is to support the fluid ejection device. In some examples, after the body is formed (e.g., in a molding process) and the fluidic structure is formed (e.g., in a separate molding process), the fluidic structure is coupled to the body via a fluidic interface. Various components (e.g., a fluid ejection device, flexible circuit, etc.) may be connected to the fluidic structure.

In one example, the fluid ejection device assembly includes a monolithically molded fluidic structure to extend between, on the one hand, a separately molded body, comprising the print fluid reservoir, and, on the other hand, a separate fluid ejection device. The fluidic structure includes a plenum to receive a print fluid from the body at a fluidic interface. The fluid ejection device assembly may include a fluid ejection device sealingly attached to the fluidic structure. The fluid ejection device is to receive the print fluid from the plenum.

In another example, the present specification describes a fluid ejection device assembly that includes a monolithically molded body with a print fluid reservoir. The fluid ejection device assembly also includes a monolithically molded fluidic structure sealingly attached to the separately molded body. The fluidic structure includes a plenum to receive the print fluid at a fluidic interface with the body, and to deliver the print fluid to a separate downstream fluid ejection device. The fluidic structure also includes a headland against which to attach the fluid ejection device.

In yet another example, the present specification also describes a monolithically molded body to couple to a separately molded fluidic structure attached to a fluid ejection device. The example body includes a print fluid reservoir. The example body also includes a recess across a downstream bottom to support the separately molded fluidic structure. The example body further includes a standpipe between the reservoir and the recess. The standpipe opens into the recess to supply print fluid from the reservoir to the fluidic structure at a fluidic interface of the recess. The example body also includes two protrusions across the bottom, with the recess in between, so that, when attached, the fluidic structure extends between the protrusions.

In another example, the present specification also describes a fluid ejection device component. The example fluid ejection device component includes a fluidic structure with at least one channel to deliver fluid to a fluid ejection die and at least one via for passing electrical routing. The example fluid ejection device component also includes a fluid ejection die to receive the fluid from the fluidic structure. The example fluid ejection device component further includes an electrical connection support substrate. The example fluid ejection device component also includes electrical routing across the electrical connection support substrate extending through the via and connected to the fluid ejection die to control the fluid ejection die.

In yet another example, the present specification also describes a fluid ejection device component. The example fluid ejection device component includes a molded fluidic element for channeling fluid from a fluid reservoir to a fluid ejection die attached to a front headland of the fluidic element. The example fluid ejection device component also includes a fluid ejection die attached to a front headland surface of the fluidic element. The example fluid ejection device component further includes an electrical connection support substrate. The example fluid ejection device component also includes electrical routing on the electrical connection support substrate connected to the fluid ejection die at one end of the electrical connection support substrate and extending through a wall of the molded fluidic element to the headland for the connection to the fluid ejection die.

This disclosure addresses different components of a fluid device assembly, and also different combinations of such components that are to form the fluid device assembly. Different "unfinished," also known as "intermediate," components or assemblies, that do not yet provide for a final on-the-shelf product, may be derived from this disclosure. Certain components or assemblies derivable from this disclosure may provide for replacement parts to replace used parts in a product such as a print cartridge. In certain instances, the fluid ejection device assemblies and/or products, or even the separate components, addressed in, or derivable from, this disclosure may provide for a complete and final product.

Turning now to the figures, FIG. 1 illustrates an example of a fluid ejection device assembly 100 in a diagrammatic cross-sectional side view. In this example, the fluid ejection device assembly 100 includes a body 102. The body 102 may form a print fluid reservoir 104, which is a chamber to contain a print fluid 106. In this example, the body 102 includes a single print fluid reservoir 104. Other example bodies may be provided with a plurality of print fluid reservoirs. It should be noted that FIG. 1 depicts the print fluid 106 with a flat top surface for ease of explanation. However, in some examples, the body 102 includes a capillary medium (e.g., a sponge or filter) to absorb and hold the print fluid 106 with a less straight line between full and empty space. The capillary force may be configured to hold the print fluid 106 against gravity while releasing the print fluid 106 when the fluid ejection device 116 ejects the print fluid 106.

In some examples, the body 102 includes multiple print fluid reservoirs 104 that are to contain different print fluids 106. For example, three print fluid reservoirs 104 of the body 102 each contain a unique color ink, for example cyan, magenta and yellow. In some examples, four print fluid reservoirs 104 include black, cyan, magenta and yellow. Thus, the fluid ejection device assembly 100 may implement multiple channels to print with different print fluids 106. It should be noted that the examples described herein disclose a fluid ejection device assembly 100 for printing with a single print fluid 106. However, the described principles may be expanded to implement a fluid ejection device assembly 100 for printing with multiple print fluids 106 and accordingly provided with a body containing multiple different print fluid reservoirs that hold respective print fluids.

In some examples, the body 102 is formed in a single molding. For example, the body 102 may be monolithically molded. As used herein, "monolithically molded" refers to an object that is molded as a single, discrete entity. In some examples, a monolithically molded object is formed in a single molding process using a single molded substance. In some examples, a monolithically molded object is formed in multiple molding processes (e.g., using a first shot mold, a second shot mold, etc.). The body 102 may be a single cast, injection molded, plastic shape formed from a molded substance such as a plastic or compound. For example, the body 102 may be formed from polyethylene, polyethylene terephthalate, or another suitable polymer material.

In some examples, the fluid ejection device assembly 100 includes a lid (not shown) on top of the body 102 to seal the print fluid reservoir 104. In some examples, the lid includes a vent and a tear-off label sealing the vent. The body 102 may define a delivery system of the fluid ejection device assembly 100 that includes the print fluid reservoir 104, a standpipe 108 to deliver print fluid 106 to the fluidic structure 110, and other ink channel features. One complete print fluid delivery system may be provided for each color.

In some examples, the body 102 includes a number of side walls 125 and a bottom 127. The side walls 125 and the bottom 127 may define a portion of the print fluid reservoir 104. The side walls 125 and the bottom 127 may define a cavity to contain the print fluid 106 within the body 102.

In some examples, the body 102 may connect to the fluidic structure 110 at a fluidic interface 112 through the standpipe 108. The standpipe 108 may be provided downstream of the reservoir 104. The standpipe 108 may comprise a shaft that fluidically connects the reservoir 104 and the fluidic structure 110. The standpipe 108 may include a downstream opening, formed in the bottom 127 of the body 102. In some examples, the standpipe 108 supplies print fluid 106 from the reservoir 104 to the downstream fluidic structure 110. The standpipe 108 may connect the reservoir 104 to a downstream plenum 114.

The fluid ejection device assembly 100 may include a fluidic structure 110 that is formed separate from the body 102. The body 102 may be molded separate from the fluidic structure 110. In some examples, the monolithically molded fluidic structure 110 extends between (i) a separately molded body 102 comprising the print fluid reservoir 104 and (ii) a fluid ejection device 116 comprising a fluid ejection die, the reservoir 104 and fluid ejection device 116 respectively upstream and downstream of the fluidic structure 110.

In some examples, the fluidic structure 110 is formed from the same material (e.g., polymer) as the body 102. In some examples, the fluidic structure 110 is formed from a different material (e.g., a second polymer) than the body 102. For instance, a resin used to mold the fluidic structure 110 may be selected for performance criteria that differ from the body 102. In other words, the material selected to form the fluidic structure 110 and body 102 may be optimized for the respective applications.

The fluidic structure 110 includes a plenum 114 to receive the print fluid 106 from the body 102. The plenum 114 may extend from the fluidic structure 110. The plenum 114 may receive the print fluid 106 at the fluidic interface 112 with the standpipe 108 of the body 102. The plenum 114 may deliver the print fluid 106 to the fluid ejection device 116. The plenum 114 is defined by a cavity in the fluidic structure 110 that channels print fluid 106 from the standpipe 108 to a feed slot of the fluid ejection device 116. The plenum 114 may include a first opening 111 at the fluidic interface 112 with the body 102, whereby the edges that define the first opening 111 are sealingly attached (e.g., adhered or welded) to the downstream edges of the standpipe 108.

The monolithically molded fluidic structure 110 may be sealingly attached to the separately molded body 102. The standpipe 108 of the body 102 may connect to a plenum 114 of the fluidic structure 110 at the fluidic interface 112. The plenum 114 may be adhered to the standpipe 108 at the fluidic interface 112 using an adhesive. In some examples, the standpipe 108 and/or fluidic structure 110 include flanges, projections, or other structures to which the plenum 114 is attached to the standpipe 108 (e.g., via an adhesive, welding, mechanical fastener, etc.). The fluidic interface 112 may allow the print fluid 106 to exit out of the standpipe 108 and into the plenum 114 of the fluidic structure 110. The fluidic interface 112 may also permit air (e.g., bubbles) entering the fluidic structure 110 to pass into the print fluid reservoir 104. Sometimes air enters the fluidic structure 110 through nozzles of the fluid ejection device 116. The air may then be vented out of the body 102 (e.g., via a vent in the lid).

The volume of the plenum 114 is defined by inner walls of the fluidic structure 110. The plenum 114 may comprise two ramped top walls 119 that diverge downwards and outwards away from the standpipe 108, and two side walls parallel to a slot-shaped second opening (e.g., see reference number 438 of FIG. 4A) and/or parallel to a longitudinal nozzle array direction of the fluid ejection device 116. Hence, the plenum 114 channels the print fluid from the first to the second opening. In one example, the second opening (438 of FIG. 4A) extends through the headland of the fluidic structure 110 that receives the fluid ejection device 116. The top walls of the plenum 114 widen the volume of the plenum 114 in the downstream direction to provide the print fluid received from the standpipe 108 over the length of the second opening and the fluid ejection device 116 to replenish all nozzles. A separate feed slot of the fluid ejection device 116 may be a trench that supplies the print fluid 106 to nozzles of the fluid ejection device 116. In one example, the fluid ejection device comprises a molded carrier (also referred to as molded component or support elsewhere in this disclosure) and the feed slot is a molded slot that provides the print fluid to fluid feed holes in a fluid ejection die that is embedded in the molded carrier, whereby the feed holes connect to ejection chambers and nozzles.

In some examples, the fluid ejection device 116 includes a fluid ejection die with number of nozzles to eject the print fluid 106 received from the plenum 114. The fluid ejection device 116 may also include a number of electrical bond pads to receive control signals for fluid ejection and/or data reading and writing. A printing device may provide control signals to the fluid ejection device 116 to control which nozzles fire. The fluid ejection device 116 may include a silicon-based microelectromechanical systems (MEMS) device with a number of nozzles. The electrical bond pads of the fluid ejection device 116 may be aligned along the long axis of the fluid ejection device 116.

In some examples, the fluid ejection device 116 is a precision overmold (POM) device comprised of a molded component and a fluid ejection die attached to the molded component (also referred to as molded "carrier" elsewhere in this disclosure). In one example, the molded component is a molded board that embeds and/or supports a relatively thin fluid ejection die. The molded component may provide rigidity to the fluid ejection device 116 and/or provide for an intermediate fluid channel. The molded component of the POM device may receive the print fluid 106 from the fluidic structure 110 and may provide the print fluid 106 to the fluid ejection die. In some examples, the molded component includes a fluid slot to receive the print fluid 106 from the plenum 114. The fluid ejection die may be attached to (e.g., embedded in) the molded component (e.g., during overmolding of the molded component). The fluid ejection die may receive the print fluid 106 through the fluid slot. In other examples the fluid ejection device is in itself (i.e., consists of) a fluid ejection die that directly receives the fluid from the second opening (438, FIG. 4A).

In some examples, the fluid ejection device 116 is coupled to the fluidic structure 110. The fluid ejection device 116 may be sealingly attached to the fluidic structure 110 with an adhesive at a second fluidic interface (e.g., see reference number 329 of FIG. 3). In some examples, the fluidic structure 110 includes a headland 115 to receive the fluid ejection device 116 (e.g., fluid ejection die). The headland 115 may be a front surface of the fluidic structure 110 that interfaces with the fluid ejection device 116. The headland 115 may include a recess (e.g., see reference number 432 of FIG. 4A) to receive the fluid ejection device 116, and a plurality of standoffs to position the fluid ejection die within the recess.

The fluid ejection device 116 may receive the print fluid 106 from the plenum 114. A fluid-tight seal may be created between the fluidic structure 110 and the fluid ejection device 116. As said, the fluidic structure 110 may include the recess (432, FIG. 4A) to receive the fluid ejection device 116. The recess (432, FIG. 4A) may house and protect the fluid ejection device 116. Thus, a front surface of the fluid ejection device 116 may be exposed while the sides and a back surface of the fluid ejection device 116 may be covered and/or surrounded by the surfaces of the fluidic structure 110 forming the recess (432, FIG. 4A). The second slot-shaped opening (438, FIG. 4A) of the plenum 114 is formed in the recess (432, FIG. 4A) of the fluidic structure 110 to provide print fluid 106 to the fluid ejection device 116.

Because the fluidic structure 110 is formed separate from the body 102, the fluidic structure 110 may be defined by a headland 115 (e.g., a front surface) and a back 117. The headland 115 may include the recess (432, FIG. 4A) for receiving the fluid ejection device 116. The back 117 may be the external back of the structure 110, opposite to the head surface, that faces the reservoir 104, which may include the external sides of the ramped top walls of the plenum 114 and the top side of the flange that defines the headland (see FIG. 4A). As can be appreciated from FIG. 4B, the back 117 may be partially defined by a flanged wall that, in use, is not in contact with the print fluid. The plenum walls themselves are in contact with the print fluid. In some examples, the headland 115 includes the recess in which the fluid ejection device 116 attaches. Thus, the head surface may face the print substrate during printing by the fluid ejection device assembly 100. The headland 115 may form a continuous and/or flush surface surrounding the fluid ejection device 116. Thus, the fluidic structure headland 115 is free of projections around the fluid ejection die.

The bottom surface of the fluidic structure 110 may interface with a printing device seal (not shown) that covers the nozzles of the fluid ejection device 116 before usage, during storage or transport. For example, the printing device seal is a separate device of the printing device that engages the continuous sealing surface when the fluid ejection device assembly 100 is not in use. The continuous sealing surface may be a homogenous (i.e., continuous) surface that is relatively flat to provide a hermetic seal.

In an installed configuration, the back 117 of the fluidic structure 110 may be positioned to face the bottom 127 of the body 102. In some examples, the bottom 127 of the body 102 includes a recess (e.g., see reference number 224 of FIG. 2) and protrusions (e.g., see reference number 229 of FIG. 2) projecting on each side of the recess (224, FIG. 2). The fluidic structure 110 may be positioned within the recess (224, FIG. 2). Since the fluidic structure 110 comprises a ramped ceiling (i.e., a partially ramped back 117), a gap 123 may be formed between the back 117 of the fluidic structure 110 and the bottom 127 of the body 102 when the fluidic structure 110 is coupled to the body 102 in an installed configuration.

In some examples, the fluid ejection device assembly 100 also includes a flexible circuit 118 electrically coupled to the fluid ejection device 116. The flexible circuit 118 may provide for an electrical interface between the fluid ejection device 116 and the printing device. The electrical interface may include electrical interface pads to interface with a printing device, for example at a front of the fluid ejection device assembly 100. The flexible circuit 118 may include a fluidic structure portion with bond pads to couple to bond pads of the fluid ejection device 116, for example at a bottom 127 of the body 102. The flexible circuit 118 may also include wire traces to couple the pads in the electrical interface to the bond pads in the fluidic structure portion. The flexible circuit may comprise a generally flat substrate with relatively flat electrical routings to connect the electrical interface pads with the die-side bond pads. Some examples are relatively flexible in that they permit a curve of the substrate, in this example to bend from a relatively vertical front to a relatively horizontal bottom. In other examples, the flexible circuit may comprise rigid portions or instead another electrical connection support substrate may be used that may be thin yet relatively rigid and that may still connect the opposite end pads. Also the electrical routing between the end pads may be supported by multiple substrates.

In some examples, to electrically connect to the bond pads, the flexible circuit 118 extends between the back of the fluidic structure 110 and the bottom 127 of the body 102. The flexible circuit 118 may be mechanically coupled to the back of the fluidic structure 110. The flexible circuit 118 may be attached (e.g., via an adhesive, weld, fastener, etc.) to the back of the fluidic structure 110. Because the flexible circuit 118 may extend along (e.g., be coupled to) the back of the fluidic structure 110, the continuous sealing surface on the headland 115 of the fluidic structure 110 can be left clear to interface with a seal or service component. Furthermore, attaching the flexible circuit 118 to the back of the fluidic structure 110 may remove the flexible circuit 118 from the corrosive environment of the headland 115 of the fluidic structure 110 due to the presence of the print fluid 106 at the headland 115. The flexible circuit 118 may be mechanically attached (e.g., via an adhesive) to the back of the fluidic structure 110. A protective material (e.g., a coverlay) covering the flexible circuit 118 may provide a continuous capping surface for a printing device seal.

In some examples, a first portion (e.g., the fluidic structure portion) of the flexible circuit 118 connects to the back of the fluidic structure 110 and a second portion (e.g., the electrical interface) of the flexible circuit 118 may connect to a front of the body 102. In other examples, the flexible circuit 118 does not attach to the body 102. For example, the electrical interface of the flexible circuit 118 may extend out from the fluidic structure 110 without attaching to the body 102.

The described examples may provide greater efficiency for manufacturing the fluid ejection device assembly 100. For example, the fluid ejection device 116 and flexible circuit 118 may be placed in the fluidic structure 110 when separated from the body 102. Then, the fluidic structure 110 may be attached to the body 102 and the flexible circuit 118 may be wrapped and attached to the body 102 to complete the fluid ejection device assembly 100. Thus, manufacturing processes may be separated such that the fluidic structure 110 and body 102 are formed separately.

By separating the fluidic structure 110 from the body 102, the molding of the body 102 may be simplified. In some examples, more complex and efficient fluid and air routing geometry is formed on the body 102 and the fluidic structure 110 as compared to an approach that forms the fluidic structure with the body. In some examples, a new body filled with new print fluid can be attached to a used and/or recycled fluidic structure 110 with the fluid ejection device, whereby the flexible circuit 118 may be either re-used as well or be new for first use or both.

As discussed above, different materials may be used to form the body 102 and the fluidic structure 110. Thus, material (e.g., resin) choices may be optimized for the respective applications of the body 102 and the fluidic structure 110. Furthermore, reliability of the fluid ejection device assembly 100 may be increased by removing the flexible circuit 118 from the capping space where a high amount of print fluid 106 accumulates.

In some examples, by separating the fluidic structure 110 molding from the body 102 molding, the fluidic structure 110 dimensional tolerances are enhanced. For example, the region of the fluidic structure 110 that houses the fluid ejection device 116 may be flatter that may be achieved with a single molding of the body 102 and fluidic structure 110. Furthermore, by molding the fluidic structure 110 separate from the body 102, a different material may be used for the fluidic structure 110 than for the body 102, which may provide enhanced dimensional tolerances than the material used of the body 102.

Figure 2:
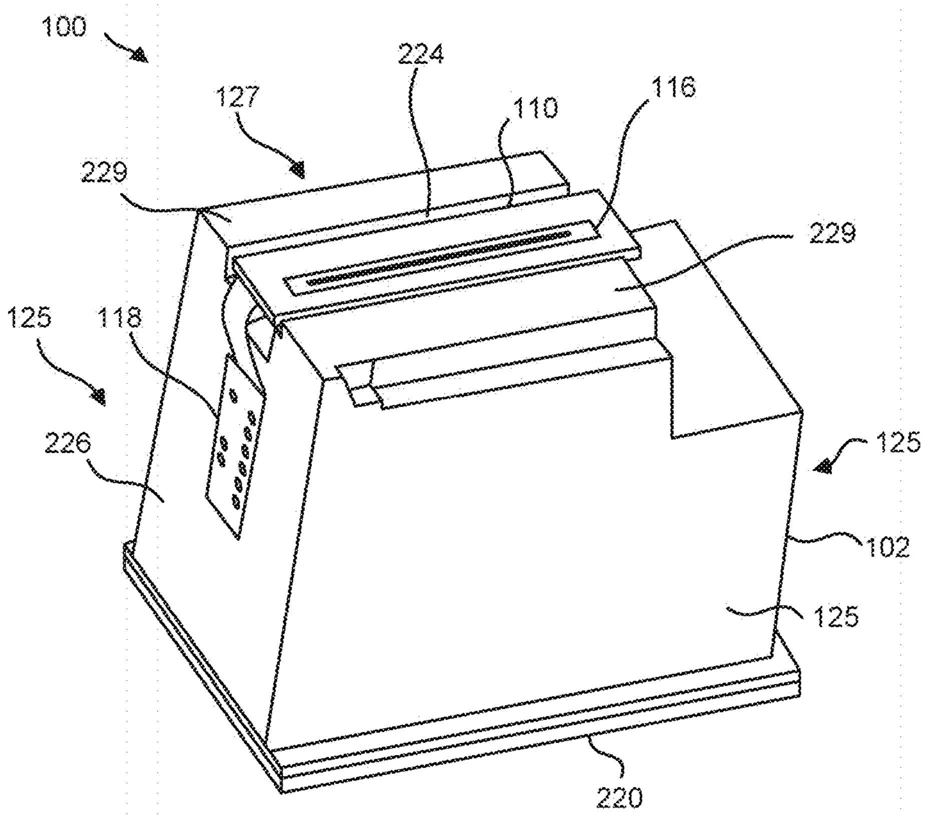
FIG. 2 illustrates a perspective view of the fluid ejection device assembly, according to an example.

FIG. 2 illustrates a perspective view of the fluid ejection device assembly 100, according to an example. In the view of FIG. 2, the fluid ejection device assembly 100 is oriented such that the fluidic structure 110 is facing upward. It should be noted that in an installed orientation in a printing device, the fluidic structure 110 may be located at the bottom of the fluid ejection device assembly 100. A lid 220 may be located at a top opening of the body 102.

As described above, the body 102 may be formed (e.g., molded) separately from the fluidic structure 110. The fluidic structure 110 may then be attached to the body 102. In some examples, the body 102 includes a recess 224 to support and/or contain the fluidic structure 110. The fluidic structure recess 224 may be formed in the bottom 127 of the body 102, whereby the bottom 127 is defined by said recess 224 and a projecting bottom body protrusion 229 on each side of the recess 224. The recess 224 and bottom protrusions 229 extend in a longitudinal direction of the body 102 (from a front 226 to a back of the body 102), parallel to each other, for example across the entire bottom 127. Thus, the recess 224 extends across the bottom 127 of the body 102, from a front up to a back wall of the body 102. The recess 224 provides for a cavity for a flexible circuit 118 extending partly along the front of the body 102 to attach to a fluid ejection die (e.g., fluid ejection device 116) through a back side of the fluidic structure 110.

In use, the protrusions 229 may form pockets in the reservoir 104 that contain print fluid, for example free flowing print fluid under the capillary material in the main reservoir space above the pockets. The free print fluid in these pockets may be absorbed by the capillary material in the reservoir 104 as the print fluid is extracted from the capillary material whereby the print fluid in the pockets may be replaced by air. In other examples the protrusions 229 may comprise air and/or capillary material in addition to or instead of the print fluid. The protrusions 229 may extend next to and on each side of the standpipe 108 and/or fluidic structure 110 so that the print fluid may flow upwards from a respective protrusion 229 into the capillary material and then down again into the standpipe 108 and plenum 114. The plenum 114 extends between the protrusions 229.

The body 102 may include a standpipe for delivering the print fluid from the reservoir 104 to the plenum 114. The standpipe 108 may open in the recess 224 in the bottom 127 to fluidically interface with the plenum 114. The fluidic structure 110 may be positioned in the fluidic structure recess 224 and attached to the body 102 (e.g., via an adhesive).

In some examples, the fluidic structure recess 224 forms a cavity for the flexible circuit 118 to attach to a back of the fluidic structure 110 opposite the fluid ejection device 116. In this example, the fluid ejection device 116 is coupled to the headland 115 of the fluidic structure 110. The flexible circuit 118 may be coupled to the back of the fluidic structure 110 such that a fluidic structure portion of the flexible circuit 118 is located between the bottom 127 of the body 102 and the back of the fluidic structure 110. An electrical interface of the flexible circuit 118 may be bent and attached to a front 226 of the body 102. The flexible circuit 118 may be electrically coupled to the fluid ejection device 116 located on the headland 115 of the fluidic structure 110, as also illustrated in FIG. 3.

Figure 3:
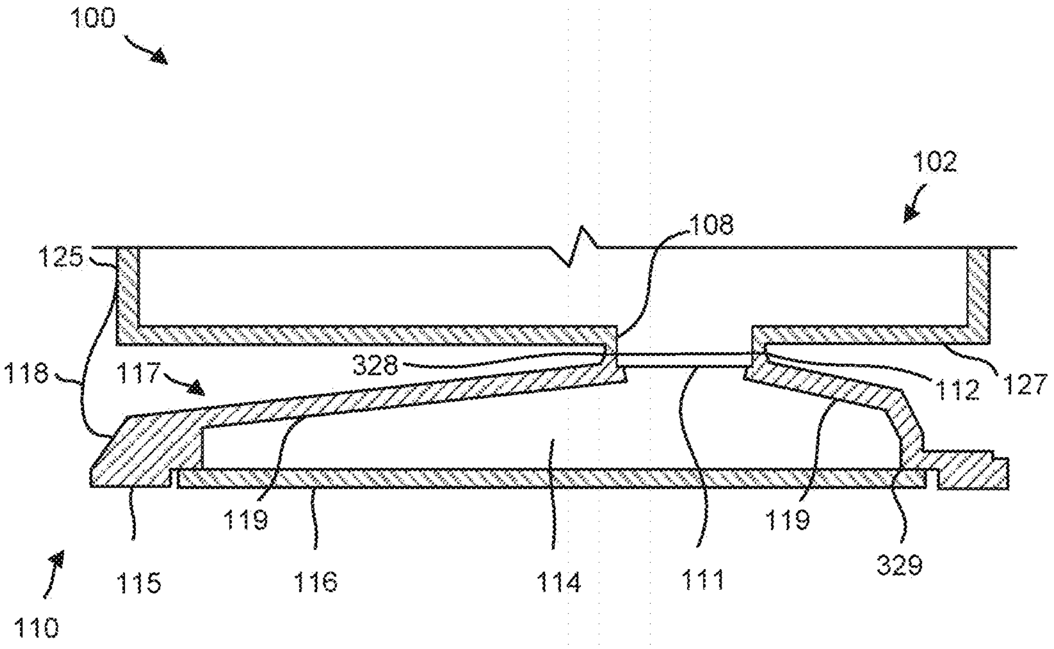
FIG. 3 illustrates a detail cross-sectional side view of a fluid ejection device assembly, according to an example.

FIG. 3 illustrates a cross-sectional side view detail of a fluid ejection device assembly 100, according to an example. In this example, the fluidic structure 110 is molded separately from the body 102. The body 102 includes a standpipe 108 formed on the bottom 127.

The fluidic structure 110 includes a plenum 114 extending from the back of the fluidic structure 110. The plenum 114 is to couple with standpipe 108 of the body 102 at the fluidic interface 112. In this example, the body 102 is coupled to the plenum 114 with an adhesive 328 located between the standpipe 108 and the plenum 114 at the fluidic interface 112.

In some examples, the fluidic structure 110 includes a second fluid interface 329 to couple the fluid ejection device 116 to the fluidic structure 110. The fluidic structure 110 may include an opening to allow print fluid 106 to pass into the fluid ejection device 116. The fluid ejection device 116 may be attached to the second fluid interface 329 with an adhesive to create a fluid-tight seal around the perimeter of the fluid ejection device 116. Thus, the print fluid 106 may be provided to the nozzles of the fluid ejection device 116 without leaking out of the second fluid interface 329.

Figure 4A:
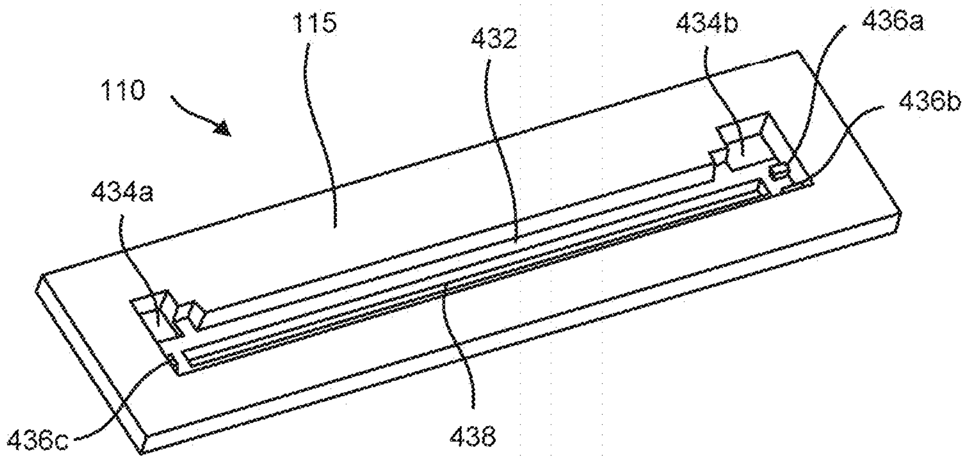
FIG. 4A illustrates a perspective view of a fluidic structure, according to an example.

FIG. 4A illustrates a perspective view of the fluidic structure 110, according to an example. In FIG. 4A, a headland 115 of the fluidic structure 110 is visible. In this example, a fluid ejection device recess 432 is formed in the headland 115 of the fluidic structure 110 to house the fluid ejection device (not shown). A longitudinal fluid ejection device opening 438 may be formed in the fluid ejection device recess 432. In some examples, the fluid ejection device opening 438 is a slot through which print fluid may flow into the fluid ejection device to replenish the nozzles.

The headland may be a surface of the fluidic structure 110 to receive the fluid ejection device. In the illustrated example, the molded longitudinal recess 432 receives the fluid ejection die whereby the headland is defined by that recess 432. The recess 432 may be open and connected to a via 434 at each longitudinal end of the recess 432 and at the opposite longitudinal ends of the fluid ejection die when positioned, to facilitate electrical bonding to the fluid ejection die without projecting electrical bonds or wiring beyond the die surface. Each via 434*a*, 434*b* is an opening in the headland that may be part of the longitudinal recess, for example molded together with the longitudinal recess 432. The via passes through the flanged wall of the fluidic structure 110, from the back 117 to the headland 115. The fluidic structure recess 432 integrally includes the vias (e.g., FIG. 4, 434*a-b*), forming a continuous (e.g., molded) opening in the headland 115, with one via at each end of the recess 432, at the opposite longitudinal ends of the fluid ejection device 116. Electrical connections may be formed between the bond pads of the flexible circuit 118 and the bond pads of the fluid ejection device 116 extending through and/or in the vias. In another example, one via is provided at a single end of the recess 432.

In some examples, a plurality of standoffs 436*a-c* are formed within the fluid ejection device recess 432 to position the fluid ejection device (e.g., fluid ejection die) within the fluid ejection device recess 432. In this example, the fluidic structure 110 includes three standoffs 436*a-c* for the fluid ejection device to sit on. The three standoffs 436*a-c* may be tightly toleranced for flatness to form a horizontal plane for the fluid ejection device.

In some examples, the fluidic structure 110 holds (i.e., supports) the fluid ejection device. An adhesive applied within the fluid ejection device recess 432 may secure the fluid ejection device and may maintain a fluid-tight channel between the print fluid reservoir in the body of the fluid ejection device assembly and the nozzles of the fluid ejection device.

The vias 434*a-b* may be openings from the headland 115 to a back 117 of the fluidic structure 110. When the flexible circuit and the fluid ejection device are attached to the fluidic structure 110, the vias 434*a-b* may expose bond pads of the flexible circuit to facilitate electrical connections to bond pads of the fluid ejection device. Thus, electrical connections may be formed between the bond pads of the flexible circuit and the bond pads of the fluid ejection device through the multiple vias 434*a-b* of the fluidic structure 110.

Figure 4B:
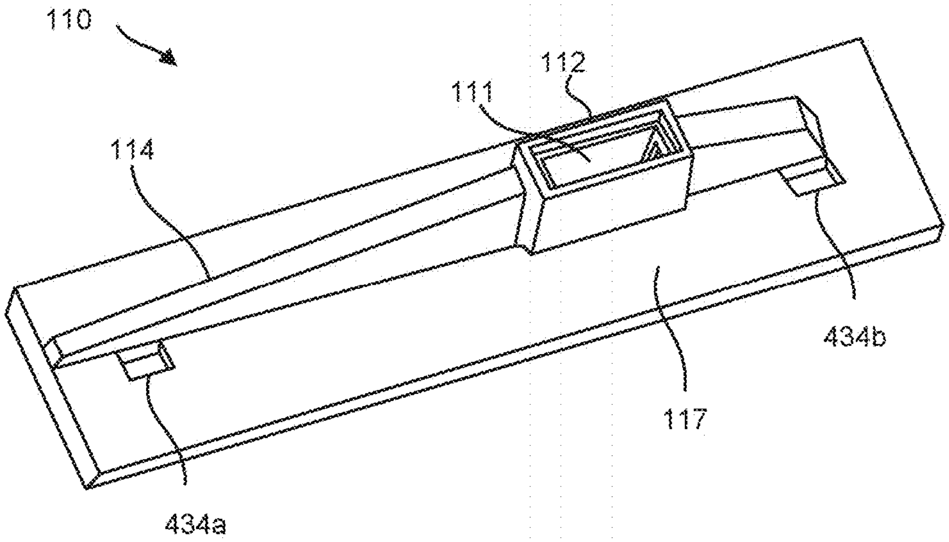
FIG. 4B illustrates another perspective view of the fluidic structure, according to an example.

FIG. 4B illustrates another perspective view of the fluidic structure 110, according to an example. In FIG. 4B, a back 117 of the fluidic structure 110 is visible. In this example, the plenum 114 extends from the back 117 of the fluidic structure 110, basically protruding to the back from the flange like wall that forms the headland, to channel the print fluid from the body 102 to the fluid ejection die, whereas the flange like wall may provide for the vias and also for surface to which the flexible circuit 118 may be attached, without contacting print fluid. The plenum 114 may receive a print fluid from the body of the fluid ejection device assembly. The plenum 114 may facilitate the flow of the print fluid to the fluid ejection device opening 438.

A fluidic interface 112 may be formed at an upstream opening 111 of the plenum 114. In this example, the fluidic interface 112 includes a surface surrounding the opening 111 to the plenum 114. An adhesive may be used to connect the second fluidic interface 112 to the body of the fluid ejection device assembly.

Figure 4C:
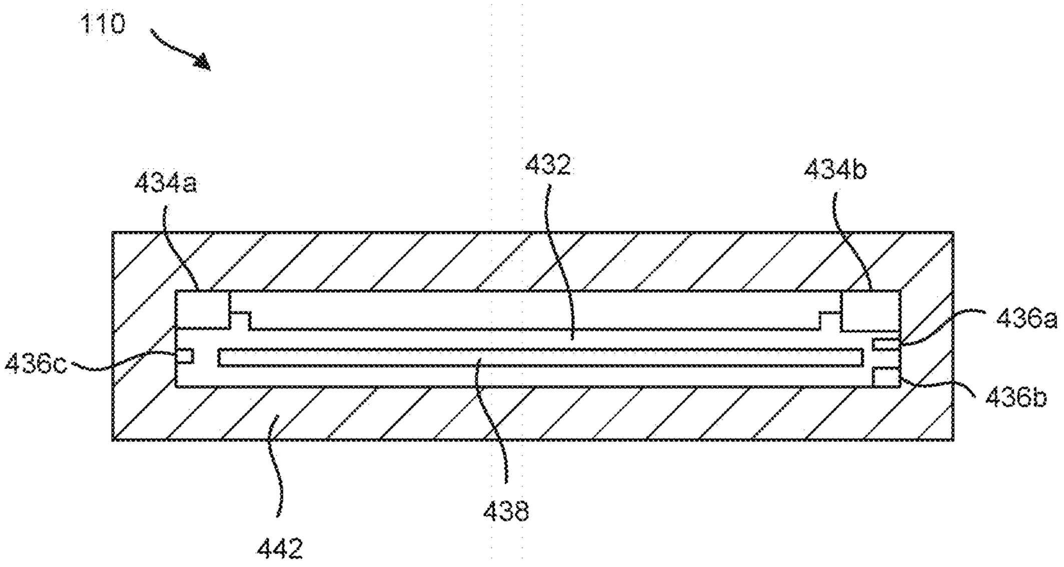
FIG. 4C illustrates a view of the headland of the fluidic structure, according to an example.

FIG. 4C illustrates a view of the headland 115 of the fluidic structure 110, according to an example. As described above, a fluid ejection device recess 432 may be formed in the headland 115. A continuous sealing surface 442 (represented in dashed lines in FIG. 4C) on the headland 115 surrounding the fluid ejection device recess 432 may interface with a printing device seal (not shown). Thus, in this example, the fluidic structure 110 provides a surface for the printing device seal to cap the nozzles of the fluid ejection device.

Figure 5A:
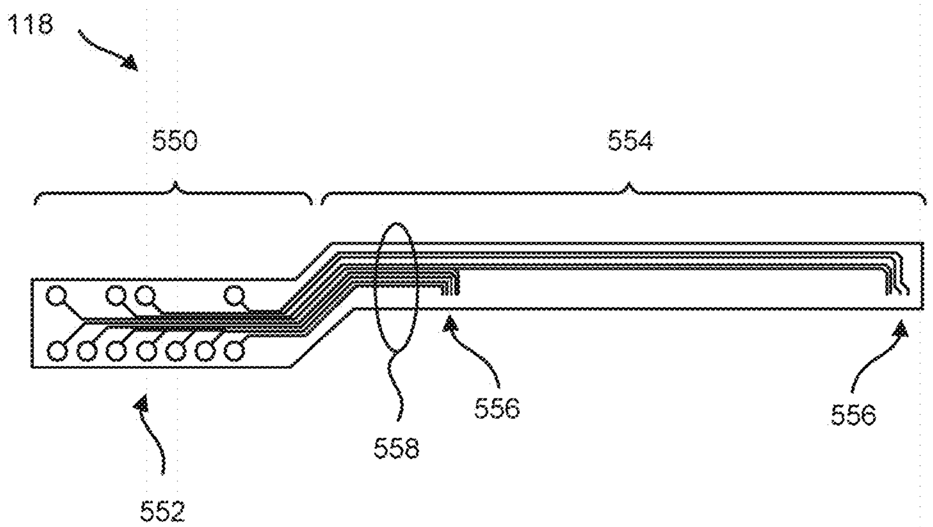
FIG. 5A illustrates a view of a flexible circuit, according to an example.

FIG. 5A illustrates a view of the flexible circuit 118, according to an example. The flexible circuit 118 (also referred to as a flex circuit) may include electronic circuits mounted on a flexible substrate (referred to herein as an electrical connection support substrate). In some examples, the electrical connection support substrate includes a flexible polymer (e.g., polyimide, polyester, etc.). As said, in other examples, at least one substrate may be used that is not entirely flexible. Thus, as used herein, the electrical connection support substrate may include the flexible circuit 118, or, for example, another relatively thin substrate to support electrical routings. In other examples, an electrical connection support substrate may not need to bend from a front 226 wall of the reservoir 104 around the bottom 127 of the reservoir 104 to the fluidic structure 110 but the electrical connection support substrate may remain relatively straight and flat, for example with printer contacts in the same plane as the ejection die bond pads 556. In certain examples the electrical connection support substrate comprises multiple layers with electrical routings between layers. In a certain sense, the electrical routings may extend "on" or "in" the substrate and routings "on" the substrate should be interpreted as also including "in".

In some examples, the flexible circuit 118 includes an electrical interface 550. The electrical interface 550 may be a portion of the flexible circuit 118 that includes contact pads 552 to form an electrical connection with a host printing device. In some examples, the pads 552 of the electrical interface 550 communicate with a dimple flex of the printing device.

The flexible circuit 118 may include a fluidic structure portion 554. In some examples, the fluidic structure portion 554 includes bond pads 556 to couple to the fluid ejection device. In some examples, wire traces 558 electrically couple the pads 552 in the electrical interface 550 to the bond pads 556 in the fluidic structure portion 554. The flexible circuit 118 may comprise electrical routings that connect the printer contact pads 552 on one end with the bond pads 556 for a fluid ejection die at the other end. The electrical routings and the bond pads 556 may be grouped so that they connect to corresponding pads of a fluid ejection die at each longitudinal end of a fluid ejection die. In the illustration two separate groups of bond pads 556 are illustrated, to connect to each end of a longitudinally shaped fluid ejection die.

Figure 5B:
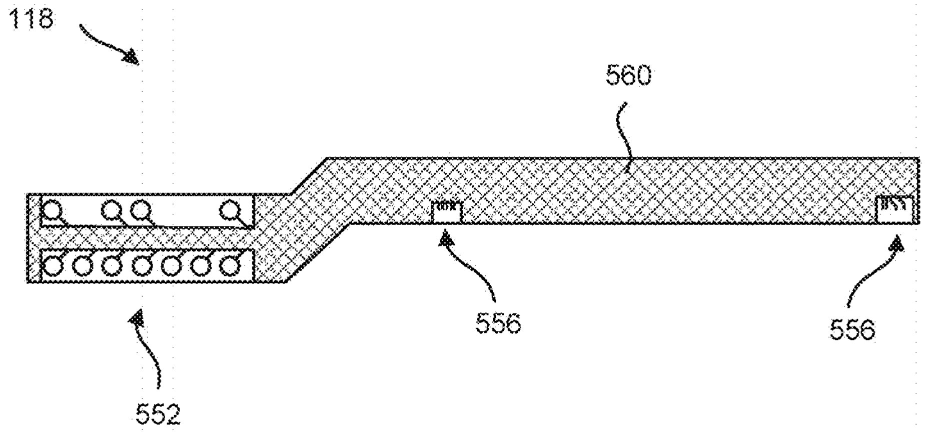
FIG. 5B illustrates another view of the flexible circuit, according to an example.

FIG. 5B illustrates another view of the flexible circuit 118, according to an example. In this example, the flexible circuit 118 as illustrated in FIG. 5A may be implemented with a protective material 560. The protective material 560 covers a portion of the wire traces 558. This protective material 560 may be referred to as a coverlay. In some examples, the protective material includes a flexible polymer (e.g., polyimide) that is bonded to the flexible circuit 118. The protective material 560 may expose the pads 552 in the electrical interface 550 and the bond pads 556 in the fluidic structure portion 554.

Figure 6:
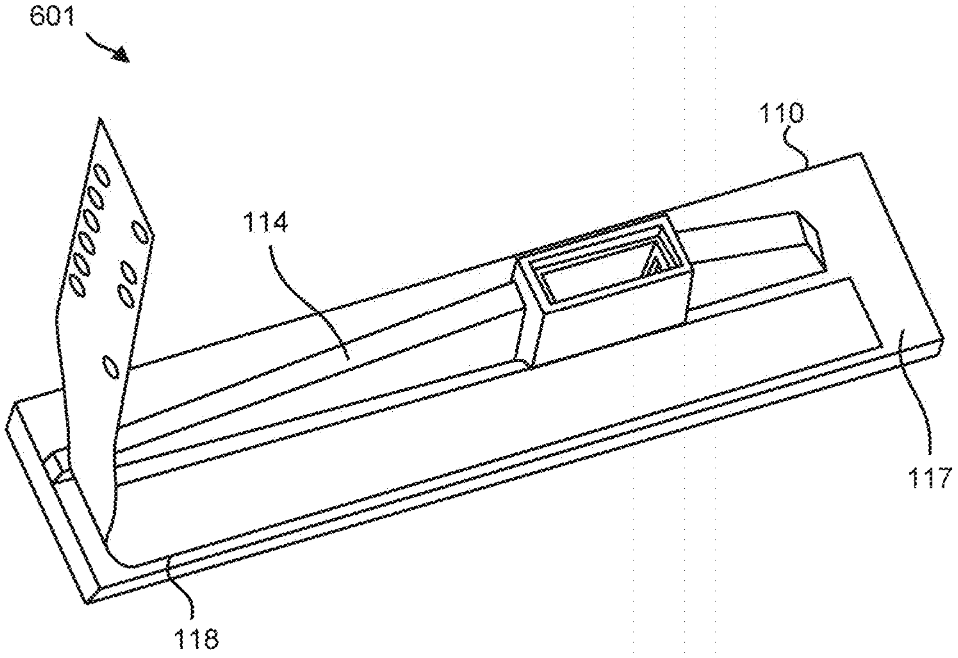
FIG. 6 illustrates a fluid ejection device component, according to an example.

FIG. 6 illustrates a fluid ejection device component 601, according to an example. In some examples, the fluid ejection device component 601 includes a flexible circuit 118 attached to a fluidic structure 110. In this example, the fluidic structure portion of the flexible circuit 118 is located on the back 117 of the fluidic structure 110. In some examples, a portion of the flexible circuit 118 is attached to the back 117 side of the fluidic structure 110 with an adhesive. Thus, the electrical routing may extend along the back 117 side of the fluidic structure 110. The electrical interface portion of the flexible circuit 118 may extend out from the fluidic structure 110. Because the flexible circuit 118 is located on the back 117 of the fluidic structure 110, the continuous sealing surface (e.g., FIG. 4C, 442) may be kept clear to interface with the printing device seal.

In some examples, the fluid ejection device component 601 includes a rigid molded component to support the fluid ejection die. The rigid molded component and the fluid ejection die may form the fluid ejection device 116. The rigid molded component is attached to the front headland 115 of the fluidic structure 110. The electrical routing from the flexible circuit 118 may extend along the rigid molded component (e.g., through a via).

In some examples, the fluid ejection device component 601 includes at least one molded fluidic element for channeling fluid 106 from a fluid reservoir 104 to a fluid ejection die attached to the front headland 115 of the fluidic element. The fluidic element may include a molded component in which the fluid ejection die is at least partially embedded and fluidic structure 110 with the plenum 114 to receive fluid 106 from the reservoir 104 and deliver the fluid to the fluid ejection die. The molded component includes a channel for the fluid 106 to flow from the plenum 114 to the fluid ejection die.

In some examples, the fluid ejection device component 601 includes a fluid ejection die attached to the front headland 115 surface of the fluidic element. As described above, the fluid ejection die may be a component of the fluid ejection device 116 described herein.

In some examples, the fluid ejection device component 601 includes an electrical connection support substrate (e.g., the flexible circuit 118) and electrical routing on the electrical connection support substrate connected to the fluid ejection die at one end of the electrical connection support substrate and extending through a wall of the molded fluidic element to the headland 115 for the connection to the fluid ejection die. The wall may include a via 434 at one or each end of the fluid ejection die through which the electrical routing extends from the back 117 side to a front side (e.g., headland 115) of the wall. A wall portion in which the via 434 is positioned is not a wall portion that defines a fluid channel. The via 434 may include an opening in the fluidic element from the headland surface 115 to the back 117 side of the fluidic element (e.g., fluidic structure 110).

Figure 7A:
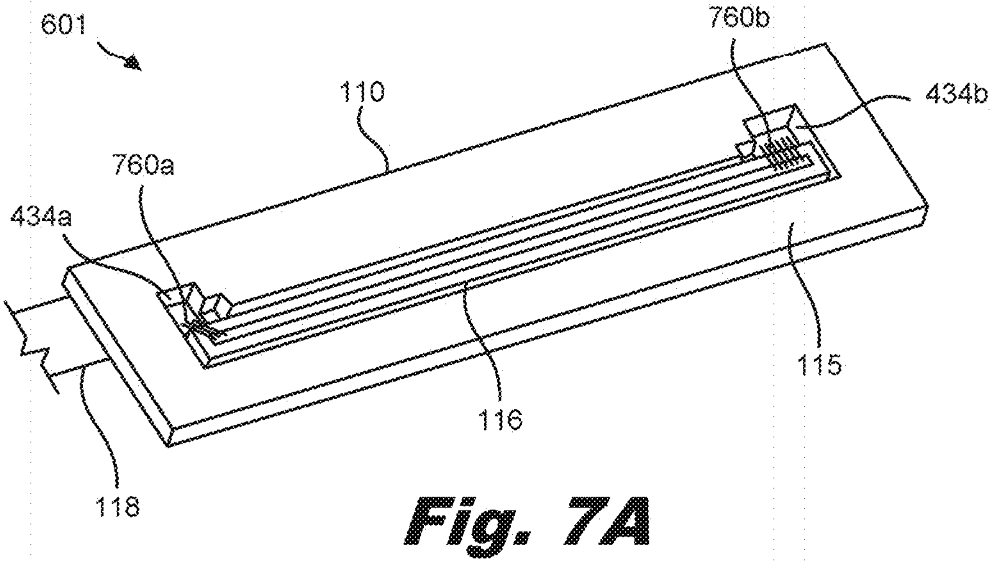
FIG. 7A illustrates electrical connections between the flexible circuit and a fluid ejection device, according to an example.

FIG. 7A illustrates electrical connections 760*a-b* between the flexible circuit 118 and the fluid ejection device 116, according to an example. In some examples, the fluid ejection device 116 (including a fluid ejection die) is located on the headland 115 of the fluidic structure 110. For example, the headland 115 may include a molded longitudinal recess 432 to receive the fluid ejection device 116. A first set of electrical connections 760*a* between the flexible circuit 118 and the fluid ejection device 116 may be made through a first via 434*a* of the fluidic structure 110. A second set of electrical connections 760*b* between the flexible circuit 118 and the fluid ejection device 116 may be made through a second via 434*b* of the fluidic structure 110. In some examples, the electrical connections 760*a-b* include wirebonding between the bond pads of the flexible circuit 118 and bond pads of the fluid ejection device 116. An example of a wirebonding approach is described in FIG. 8.

Figure 7B:
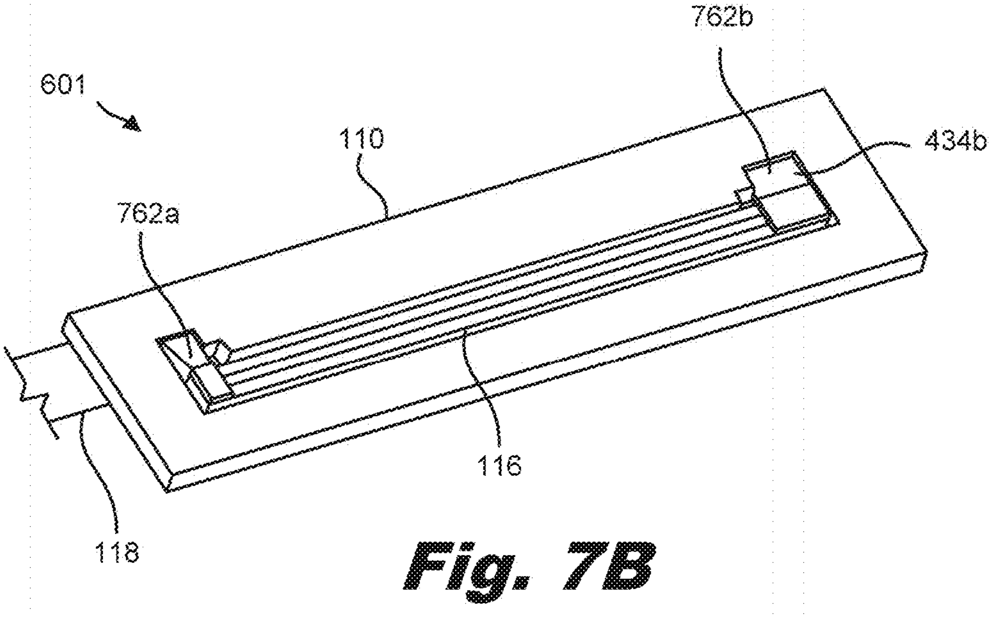
FIG. 7B illustrates covers to protect the electrical connections between the flexible circuit and the fluid ejection device, according to an example.

FIG. 7B illustrates encapsulant covers 762*a-b* to protect the electrical connections 760*a-b* between the flexible circuit 118 and the fluid ejection device 116, according to an example. In this example, a protective material forms encapsulant covers 762*a-b* over the electrical connections 760*a-b*. In some examples, the encapsulant covers 762*a-b* are formed from an adhesive, resin, or other substance that fills the via 434*a-b* and encapsulates the electrical connections 760*a-b* between the flexible circuit 118 and the fluid ejection device 116. The encapsulant covers 762*a-b* may protect and preserve the electrical connections 760*a-b* between the flexible circuit 118 and the fluid ejection device 116.

Figure 8:
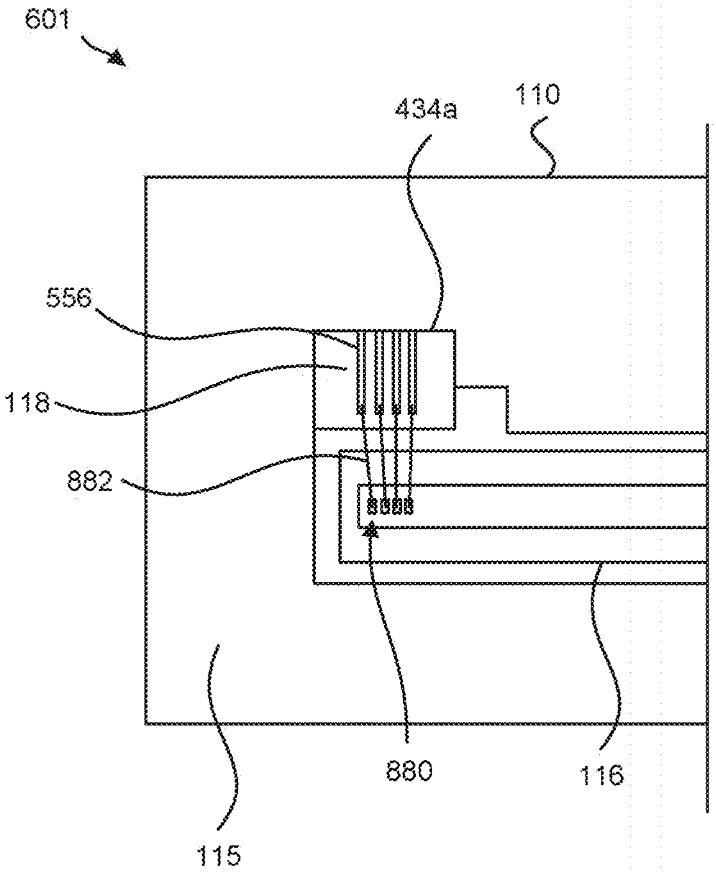
FIG. 8 illustrates wirebonds between the flexible circuit and the fluid ejection device, according to an example.

FIG. 8 illustrates wirebonds 882 between the flexible circuit 118 and the fluid ejection device 116, according to an example. In this case, a wirebond 882 may be formed between a bond pad 556 of the flexible circuit 118 and a bond pad 880 of the fluid ejection device 116. The wirebond 882 may pass through the via 434*a* of the fluidic structure 110. As described above, the via 434*a* of the fluidic structure 110 may expose the bond pads 556 of the flexible circuit 118 below so that the bond pads 556 can be wirebonded to the bond pad 880 of the fluid ejection device 116. In some examples, the vias of the fluidic structure 110 are formed to provide clearance to the wirebond 882. A minimum clearance between the walls of the via 434*a* and the wirebond 882 may be provided. Thus, the electrical routing includes a plurality of wirebonds 882 passing through the via 434*a* to connect a plurality of bond pads 556 on the electrical connection support substrate (e.g., flexible circuit 118) to a plurality of bond pads 880 on the fluid ejection die (e.g., fluid ejection device 116)

Figure 9:
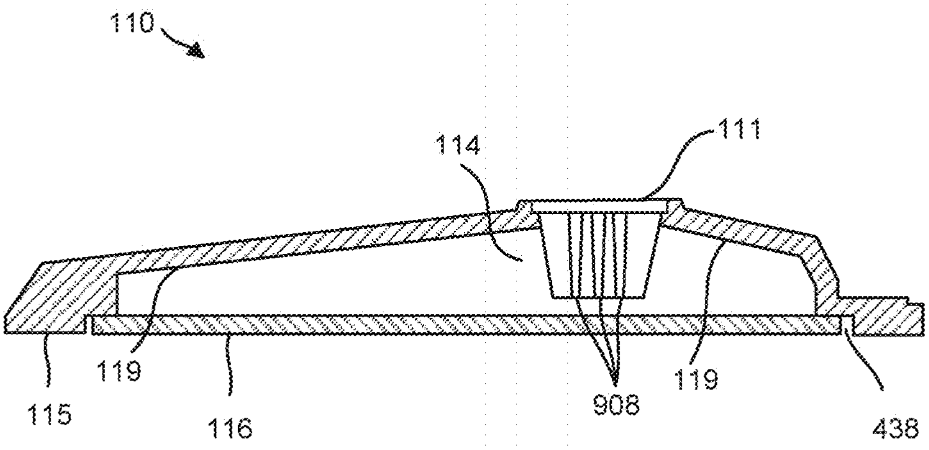
FIG. 9 illustrates an example of a fluidic structure in a cross-sectional side view.

FIG. 9 illustrates an example of a fluidic structure 110 in a cross-sectional side view. The fluidic structure 110 may be a component of a fluid ejection device assembly that is formed separate from the body housing the print fluid reservoir. The body may be molded separate from the fluidic structure 110. In some examples, the fluidic structure 110 are formed from a molded compound (e.g., polymer).

In some examples, the structure 110 is a fluidic structure to extend between a separately molded print fluid reservoir and a fluid ejection device 116. In some examples, the fluid ejection device 116 includes a fluid ejection die with number of nozzles to eject the print fluid received from the plenum 114. The fluid ejection device 116 may also include a number of electrical bond pads to receive control signals. A printing device may provide control signals to the fluid ejection device 116 to control which nozzles fire. In some examples, the fluid ejection device 116 is a silicon-based microelectromechanical systems (MEMS) device with a number of nozzles. The electrical bond pads of the fluid ejection device 116 may be aligned along the long axis of the fluid ejection device 116.

In some examples, the fluid ejection device 116 includes at least one embedded fluid ejection die in a molded compound carrier. For example, the fluid ejection device 116 may be a precision overmold (POM) device with a molded component attached to a fluid ejection die. The molded component of the POM device may receive the print fluid from the fluidic structure 110 and may provide the print fluid to the fluid ejection die. In some examples, the molded component includes a fluid slot to receive the print fluid from the plenum 114. The fluid ejection die may be attached to the molded component (e.g., during over-molding of the molded component). The fluid ejection die may receive the print fluid through the fluid slot.

The fluid ejection device 116 may attach to the fluidic structure 110. In some examples, the fluidic structure 110 is molded separately from the print fluid reservoir. In some examples, the fluidic structure 110 is a monolithically molded object. As used herein, "monolithically molded" refers to an object that is molded as a single, discrete entity. In some examples, a monolithically molded object is formed in a single molding process using a single molded substance. In some examples, a monolithically molded object is formed in multiple molding processes (e.g., using a first shot mold, a second shot mold, etc.) to form a single, discrete entity.

In some examples, the fluidic structure 110 includes a plenum 114. The plenum 114 may receive a print fluid (e.g., from the print fluid reservoir). The plenum 114 may direct the received print fluid to the second opening 438 of the headland 115, which provides the print fluid to the fluid ejection device 116.

In some examples, the plenum 114 includes a first opening 111 to interface with, and receive print fluid from, the print fluid reservoir. For example, a print fluid from the print fluid reservoir enters the plenum 114 of the fluidic structure 110 through the first opening 111. The first opening 111 may be located on a back 117 of the fluidic structure 110 when the fluidic structure 110 is in an installed orientation in a printing device.

In some examples, the first opening 111 has a primarily rectangular shape. In some examples, the corners of the first opening 111 are rounded to facilitate fluid and air transfer. In some examples, the first opening 111 has other shapes (e.g., circular, oval, capsule, square, etc.).

The fluidic structure 110 includes a headland 115. In some examples, the headland 115 is a portion of the fluidic structure 110 that includes at least one second opening 438. The headland 115 receives the fluid ejection device 116 for delivering print fluid to the fluid ejection device 116 through the second opening 438. The fluid ejection device 116 may be attached to the headland 115 with an adhesive.

The plenum 114 may connect to the second opening 438. In some examples, the plenum 114 is defined (e.g., formed) by a ceiling and a floor. In some examples, the plenum 114 includes a first wall and a second wall. A relatively large plenum ceiling height (e.g., as compared to the size of the fluid ejection device 116) may allow for ample print fluid flow to the fluid ejection device 116. The plenum ceiling height may also provide room for bubbles to escape the plenum 114 and exit out of the first opening 111 into the print fluid reservoir. In some examples, the plenum 114 includes opposite walls along a longitudinal direction of the plenum 114, and along a length of the second opening 438. The second opening 438 may have a longitudinal shape, whereby the grooves 908 extend on at least one of those side walls of the plenum 114 perpendicular to the second opening 438. An example of the walls of the plenum 114 is described in FIGS. 4A-4C.

In some examples, the plenum 114 includes grooves 908 extending between the first opening 111 into the plenum 114. The grooves 908 may extend longitudinally between the first opening 111 and the second opening 438. In some examples, the grooves 908 of the plenum 114 form a grooved standpipe. In some examples, the grooves 908 are formed in a wall of the plenum 114. In some examples, the grooves 908 extend into the wall of the plenum 114 adjacent the first opening 111. The grooves 908 may start at or near the first opening 111 and may extend into the wall of the plenum 114.

In some examples, the grooves 908 include at least three grooves. In some examples, a first set of grooves 908 is formed on a first wall of the plenum 114 and a second set of grooves 908 is formed on a second wall of the plenum 114. In some examples, the height of the grooves 908 is more than half of the height of the plenum 114.

In some examples, the grooves 908 are sized to restrict bubbles in a print fluid contained within the plenum 114 from entering the grooves 908. For example, bubbles may enter the plenum 114 through nozzles in the fluid ejection device 116. If these bubbles remain within the plenum 114, the bubbles may block the flow of print fluid through the plenum 114. The grooves 908 may prevent bubbles in the print fluid from adhering to the second opening 438. The grooves 908 may form a fluidic pathway for the print fluid to pass through the first opening 111 of the plenum 114 downstream to the fluid ejection device 116. The grooves 908 may be sized to prevent bubbles in the plenum 114 from entering the grooves 908 and blocking the flow of print fluid.

In some examples, the fluidic structure 110 is adhered to the reservoir using an adhesive bond. The grooves 908 may be configured to prevent bubbles in the print fluid from adhering to the adhesive bond. The grooves 908 may extend into at least one side wall of the plenum 114 from a point adjacent the adhesive bond up to a point adjacent the second opening 438, to trap bubbles and form a fluidic pathway for the print fluid. The grooves 908 may position the bubbles away from the adhesive bond.

Figure 10:
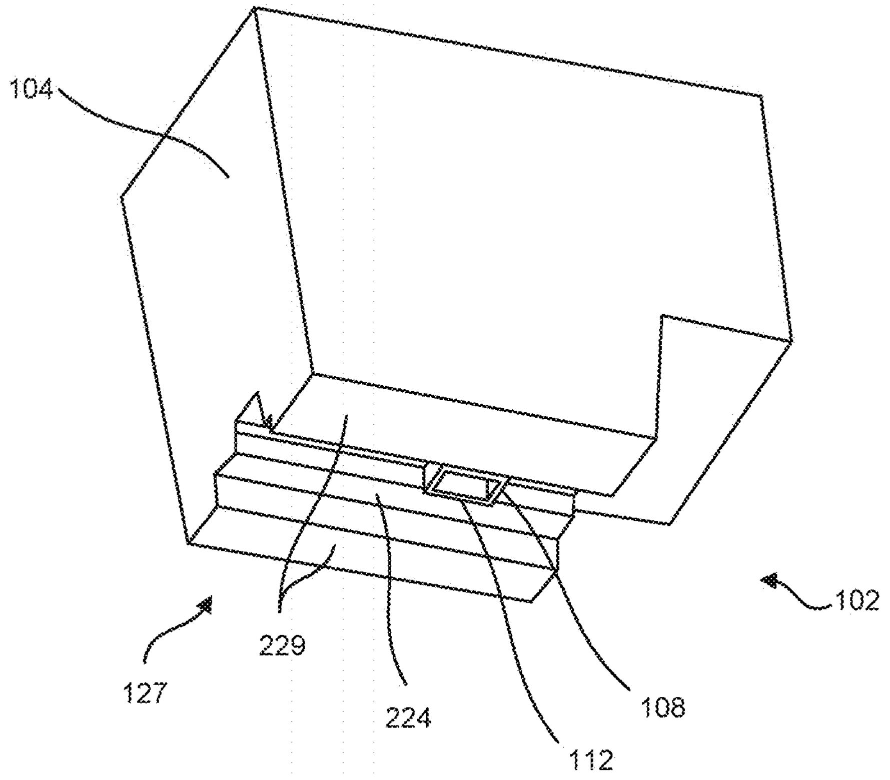
FIG. 10 illustrates a body for a fluid ejection device assembly in a perspective view, according to an example.

FIG. 10 illustrates a body 102 for a fluid ejection device assembly in a perspective view, according to an example. The body 102 may be a monolithically molded body to couple to a separately molded fluidic structure (not shown) attached to a fluid ejection device (not shown). The body 102 includes a print fluid reservoir 104, which is a chamber to contain a print fluid. The body 102 also includes a recess 224 at a downstream bottom 127 to support the separately molded fluidic structure. The body 102 includes a standpipe 108 between the reservoir 104 and the recess 224. The standpipe 108 opens into the recess 224 to supply print fluid from the reservoir 104 to the fluidic structure at a fluidic interface 112 of the recess 224. In some examples, the recess 224 extends across the bottom 127 of the body 102 and provides for a cavity for a flexible circuit (not shown) to attach to a back of the fluidic structure opposite the fluid ejection device.

What is claimed is:

1. A fluid ejection device assembly, comprising:
- a monolithically molded fluidic structure to extend between a separately molded body, the body comprising a print fluid reservoir, and a separate fluid ejection device, the fluidic structure comprising:
  - a plenum to receive a print fluid from the body at a fluidic interface; and
  - a fluid ejection device sealingly attached to the fluidic structure, the fluid ejection device to receive the print fluid from the plenum, wherein the fluidic structure comprises a headland to receive the fluid ejection device.

2. The fluid ejection device assembly of claim 1, wherein the fluid ejection device comprises:
- a molded component with a fluid slot to receive the print fluid from the plenum; and
- a fluid ejection die attached to the molded component, the fluid ejection die to receive the print fluid through the fluid slot.

3. The fluid ejection device assembly of claim 2, further comprising a flexible circuit coupled to the molded component of the fluid ejection device.

4. The fluid ejection device assembly of claim 3, wherein the fluidic structure further comprises at least one molded via in which bond pads of the flexible circuit electrically connect to bond pads of the fluid ejection device.

5. The fluid ejection device assembly of claim 4, the fluidic structure comprising a molded longitudinal recess to receive the fluid ejection device, the recess including a via at one or each end of the recess at a respective longitudinal end of the fluid ejection device, with electrical connections between the bond pads of the flexible circuit and the bond pads of the fluid ejection device extending through and/or in the vias.

6. The fluid ejection device assembly of claim 5 wherein the via extends next to the fluid ejection device and/or next to the plenum; and/or through the structure.

7. The fluid ejection device assembly of claim 3, wherein the flexible circuit is coupled to a back of the fluidic structure, opposite to a headland, leaving a continuous and/or flush headland.

8. The fluid ejection device assembly of claim 5, wherein the flexible circuit is coupled to the fluid ejection die through the vias and at the back of the fluidic structure opposite to the headland.

9. The fluid ejection device assembly of claim 7, wherein the flexible circuit extends into a recess in the body over the back of the fluidic structure.

10. The fluid ejection device assembly of claim 7, wherein the flexible circuit extends next to the plenum of the fluidic structure over the back of the fluidic structure opposite to the headland, to connect to bond pads of the fluid ejection device through vias through the headland.

11. The fluid ejection device assembly of claim 1, further comprising the body, wherein the fluidic structure extends within a recess of the body so that the plenum extends between bottom protrusions of the body.

12. A fluid ejection device assembly, comprising:

a monolithically molded body comprising a print fluid reservoir; and a monolithically molded fluidic structure sealingly attached to the body, the fluidic structure molded separately from the body, the fluidic structure comprising:

a plenum to receive the print fluid at a fluidic interface with the body, and to deliver the print fluid to a separate downstream fluid ejection device, and a headland against which to attach the fluid ejection device.

13. The fluid ejection device assembly of claim 12, the body comprising a capillary medium in the reservoir to hold print fluid at an appropriate backpressure, and a standpipe downstream of the reservoir to supply print fluid from the reservoir to the plenum; wherein the plenum is adhered to the standpipe at the fluidic interface using an adhesive.

14. The fluid ejection device assembly of claim 12, wherein the fluidic structure comprises a headland to receive the fluid ejection device and an opening through the headland to supply the print fluid from the plenum to the fluid ejection device.

15. The fluid ejection device assembly of claim 12, wherein the headland comprising:

a recess to receive the fluid ejection device; and a plurality of standoffs to position the fluid ejection device within the recess.

16. The fluid ejection device assembly of claim 15, wherein the fluidic structure headland is free of projections around the recess.

17. The fluid ejection device assembly of claim 12, the fluidic structure comprising in its headland a molded longitudinal recess to receive the fluid ejection device, the recess including an open via at each end of the recess at the opposite longitudinal ends of the fluid ejection device, to facilitate electrical bonding to the fluid ejection device without projecting electrical bonds or wiring beyond the device surface.

18. The fluid ejection device assembly of claim 15, wherein the fluidic structure further comprises a continuous and/or flush surface surrounding the recess.

19. A monolithically molded body to couple to a separately molded fluidic structure attached to a fluid ejection device, the body comprising:

a print fluid reservoir;

a recess across a downstream bottom to support the separately molded fluidic structure;

a standpipe between the reservoir and the recess, the standpipe opening into the recess to supply print fluid from the reservoir to the fluidic structure at a fluidic interface of the recess; and two protrusions across the bottom, with the recess in between, so that, when attached, the fluidic structure extends between the protrusions, wherein the fluidic structure comprises a headland to receive the fluid ejection device.

20. The body of claim 19, wherein the recess extends across the bottom of the body, from a front up to a back wall, and provides for a cavity for a flexible circuit extending partly along the front of the body to attach to a fluid ejection die through a back side of the fluidic structure.

* * * * *